Oct. 31, 1961  M. J. FOX  3,006,448
CLUTCH MECHANISM
Filed Jan. 2, 1959  2 Sheets-Sheet 1
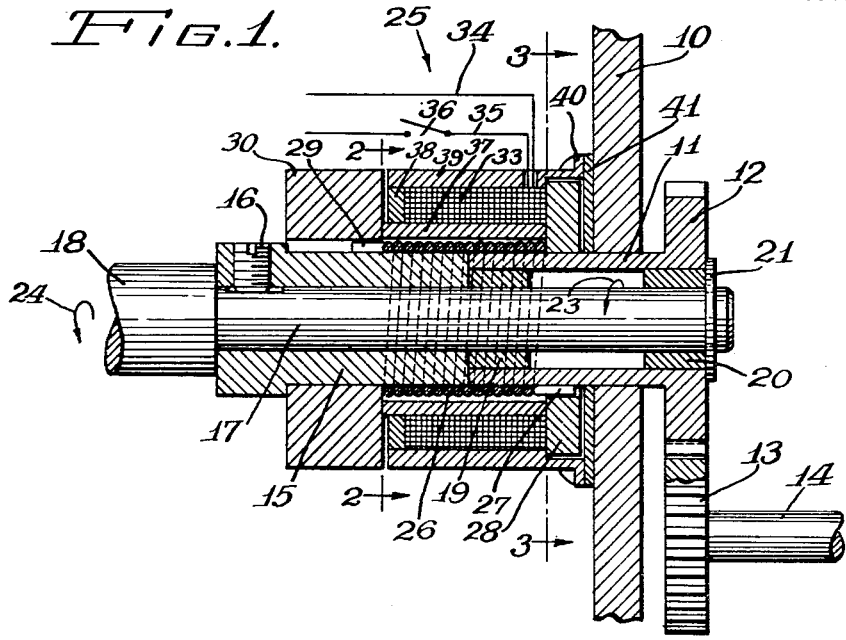
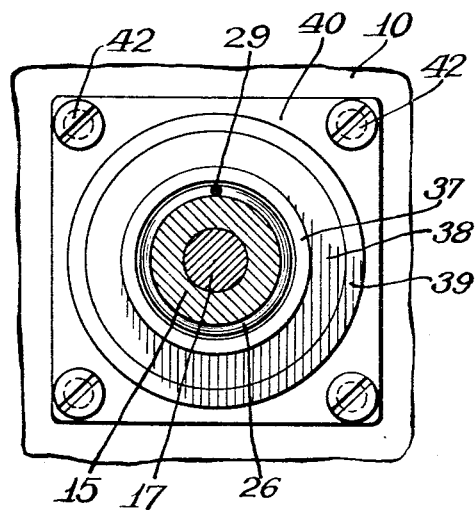 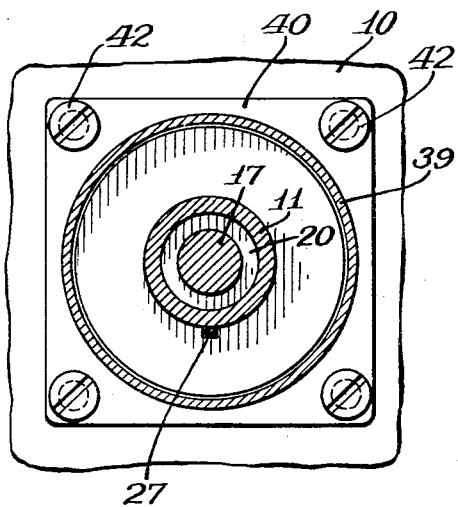
Inventor:
Merrill J. Fox
By
Robert F. Miehle, Atty.

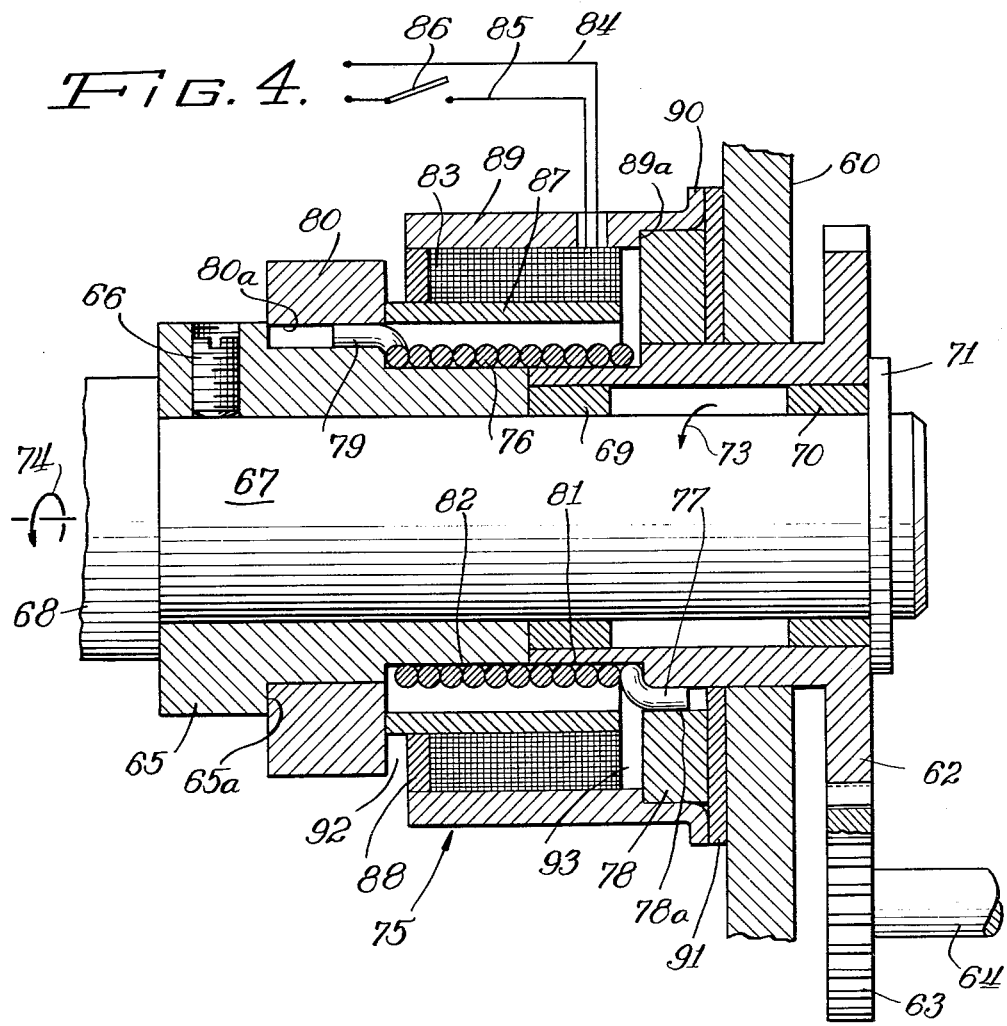

United States Patent Office 3,006,448
Patented Oct. 31, 1961

3,006,448
CLUTCH MECHANISM
Merrill J. Fox, Chicago, Ill., assignor to Bell & Howell Company, Chicago, Ill., a corporation of Illinois
Filed Jan. 2, 1959, Ser. No. 784,748
7 Claims. (Cl. 192—81)

This application is a continuation-in-part of my copending application Serial No. 689,862, filed October 14, 1957, now abandoned, for "Clutch Mechanism" and assigned to the same assignee.

This invention relates, generally, to clutch mechanisms and it has particular relation to such mechanisms of the helical spring type intended particularly for use in controlling the operation of the feeder for microfilm recording apparatus which conveys the documents to be recorded from a stack thereof into the recording position.

Among the objects of this invention are: To provide for simply and efficiently declutching a helical spring from driving connection between driving and driven members in a new and improved manner; to control the declutching of the helical spring magnetically in a novel manner; to provide a compact arrangement of the clutch spring and magnetic control therefor; to expedite the declutching of the spring from the driving and driven members; and to employ the inertia of a flywheel for assisting in the declutching action.

Another object of the invention is to provide a clutch mechanism having a coiled spring with an interference fit with a driving shaft and a driven shaft together with means for stopping one end of the spring from movement with the driving shaft, a flywheel connected to the other end of the spring to turn the spring in a direction freeing the driven shaft and means for holding the inertia member in a position holding the spring declutched from the driven shaft. There also may be provided means for limiting movement of the spring along the shaft.

A further object of the invention is to provide a clutch mechanism in which a coiled clutch spring is mounted on a driving shaft and a driven shaft with an armature disc of magnetic material connected to one end of the spring and a flywheel of magnetic material connected to the other end of the spring. There also may be provided an electromagnet having a core which frictionally engages the armature disc and the flywheel at such portions thereof that when the electromagnet is energized the rotation of the armature disc is stopped more rapidly than is the rotation of the flywheel, whereby the flywheel rotates sufficiently more than the armature before the flywheel is stopped that the spring frees the driven shaft completely. The core may be of a design adapted to engage the armature disc radially farther from its axis of rotation than the portion of the flywheel engaged by the core to provide a frictional force between the core and the disc greater than that between the core and the flywheel.

Other objects of this invention will, in part, be obvious and in part appear hereinafter.

This invention is disclosed in the embodiment thereof shown in the accompanying drawing and it comprises the features of construction, combination of elements and arrangement of parts that will be exemplified in the construction hereinafter set forth and the scope of the application of which will be indicated in the appended claims.

For a more complete understanding of the nature and scope of this invention, reference can be had to the following detailed description, taken together with the accompanying drawing, in which:

FIG. 1 is a longitudinal sectional view showing a preferred embodiment of the clutch mechanism;

FIG. 2 is a vertical sectional view taken generally along the line 2—2 of FIG. 1;

FIG. 3 is a vertical sectional view taken generally along the line 3—3 of FIG. 1; and FIG. 4 is a longitudinal sectional view showing an alternate embodiment of the invention.

Referring now to the drawing, it will be observed that the reference character 10 designates a frame plate which may form a part of a frame of a microfilm recorder. Journaled in the frame plate 10 is a hub 11 having a gear 12 formed integrally therewith. The hub 11 and gear 12 comprise a driving member that is arranged to be clutched to a driven member in a manner to be described. Any suitable means can be employed for constantly driving the gear 12 in one direction. For example, a gear 13 on a drive shaft 14 can be employed.

The driven member includes a sleeve 15 which is located in endwise relation with respect to the hub 11 and is telescoped over and secured by a set screw 16 to a reduced diameter portion 17 of a driven shaft 18. The driven member thus comprises the sleeve 15 and the driven shaft 18. It will be observed that the external diameter of the sleeve 15 is the same as the external diameter of the hub 11 with the external surface of the one forming an extension of the external surface of the other. The reduced diameter portion 17 is journaled in the bearing bushings 19 and 20 that are located within the hub 11. The reduced diameter portion 17 projects outwardly beyond the gear 12 and is secured in position with respect thereto by a snap washer 21.

It will be understood that the driving member comprising the hub 11 and gear 12 is driven constantly in one direction. For example, it may be rotated in the direction indicated by the arrow 23. The driven member comprising the sleeve 15 and driven shaft 18 are to be rotated in the same direction as the driving member or as indicated by the arrow 24.

In order to place the driving member selectively in driving engagement with the driven member a clutch mechanism, shown generally at 25, is employed. It includes a clutch spring 26 that is prestressed and wound about the external surfaces of the hub 11 and sleeve 15. About the same number of turns of the spring 26 grip the respective surfaces of the hub 11 and sleeve 15. The spring 26 is a helical spring and the initial tension is such that, when it is applied, as illustrated, it normally slightly grips the hub 11 and sleeve 15. The turns of the spring 26 are so arranged that they tend to increase their gripping action on the hub 11 and sleeve 15 when the former is rotated in the direction indicated by the arrow 23.

The clutch mechanism 25 includes means, which now will be described, that permits the control of the helical clutch spring 26 and its gripping action with respect to the hub 11 and sleeve 15. It will be observed that one end 27 of the helical spring 26 extends into and rotates with an armature 28 that is in the form of an annular disc of magnetic material which is rotatably mounted on the hub 11 and is movable axially endwise thereof. When the helical clutch spring 26 is in driving connection with the hub 11 and sleeve 15, the armature 28 rotates conjointly with the hub 11.

In order to promote the release of the helical spring 26 from gripping engagement with the driving and driven members its other end 29 extends into and rotates with a flywheel 30 that is rotatably mounted on the sleeve 15. It will be understood that normally the flywheel 30, which is formed of non-magnetic material, rotates conjointly with the sleeve 15. However, when the declutching operation is performed, relative rotation takes place between the sleeve 15 and the flywheel 30. Also, when the driven shaft 18 is stopped, the flywheel 30 likewise is stopped.

In order to control the armature 28 for declutching the helical spring 26 from the driving and driven members, a coil 33 is provided which, as shown in FIG. 1, surrounds the helical spring 26 and is located in endwise alignment with the armature 28. The coil 33 is energized over conductors 34 and 35 from a suitable current source, such as a direct current source, under the control of a switch 36. When the switch 36 is closed, the coil 33 is energized and the armature 28 is attracted toward a cylindrical core 37 of magnetic material which is located stationarily inside of the coil 33 and around the helical spring 26. The magnetic circuit around the coil 33 includes, in addition to the cylindrical core 37, an annular end plate 38 and a cylindrical housing 39 from which a flange 40 extends that overlies a plate 41 of non-magnetic material. As shown in FIGS. 2 and 3 the flange 40 and plate 41 are secured to the frame plate 10 by means of screws 42.

In operation, assuming that the driving member comprising the hub 11 and gear 12 is rotated in a direction indicated by the arrow 23, the driven member comprising the sleeve 15 and shaft 18 is rotated in the same direction as indicated by the arrow 24. This action is brought about by the helical clutch spring 26 which grips the external surfaces of the hub 11 and sleeve 15. The gripping action is due partly to the inherently resiliency and configuration of the turns making up the helical spring 26 and in part due to the rotation of the hub 11 in the direction indicated by the arrow 23.

When it is desired to declutch the driven member from the driving member, the switch 36 is closed and the coil 33 is energized. The armature 28 which previously had been rotating conjointly with the hub 11 is stopped. Because of this and the continued rotation of the hub 11, the gripping engagement between its surface and the turns of the helical spring 26 surrounding it is released. Likewise there is a corresponding release of the gripping action applied to the external surface of the sleeve 15. The flywheel 30, which previously had been rotating at the speed of the sleeve 15, tends to continue to rotate in the same direction which is a direction that tends to unwind the convolutions of the helical spring 26 from the driving and driven members and hence promotes the releasing action in order to increase the speed at which the declutching operating is performed.

The design of the flywheel 30 can be varied, depending upon the type of operation that is desired. If a relatively high speed is involved, the mass of the flywheel 30 can be reduced depending upon the action required and the mechanical strength of the helical spring 26.

If the assist to the declutching action provided by the flywheel 30 is not required, the flywheel 30 can be omitted. The declutching action then would be controlled solely by stopping the end 27 of the helical spring 26 by stopping further rotation of the armature 28 on energization of the coil 33.

Immediately upon opening of the switch 36 and de-energization of the coil 33, the armature 28 is released. The helical spring 26 then is free to resume gripping engagement with the surfaces of the hub 11 and sleeve 15 and the driving connection is reestablished between the driving member and the driven member.

A clutch mechanism forming an alternate embodiment of the invention and shown in FIG. 4 includes a driving shaft or hub 61 having a gear 62 and journaled in frame plate 60. The hub 61 is driven continuously in one direction by a gear 63 on a drive shaft 64. The driven member includes a cylindrical sleeve 65 keyed by set screw 66 to a reduced portion 67 of driven shaft 68. The hub 61 mounts bearing bushings 69 and 70, and a snap washer 71 secures the gear 62 on the shaft 68. The gear 63 and shaft 64 drive the gear 62 and hub 61 in the direction of arrow 73 and are to rotate the shaft 68 in the same direction as indicated by arrow 74.

To selectively drive the output shaft 68, a clutch mechanism 75 is adapted to selectively connect the hub 61 to the sleeve 65. The clutch mechanism 75 includes a helical spring 76 having an interference fit on adjacent, equilength reduced portions 81 and 82 forming together a groove in which the spring lies and the ends of which restrict movement of the spring along the hub 61 and sleeve 65 and confine the spring to the groove except for the ends 77 and 79 of the spring. The end 77 fits into an inner notch or groove 78a in an armature 78 of magnetic material which is freely rotatable on the hub 61. The armature also is freely slidable on the hub 61 between a plate 91 of non-magnetic material and an annular shoulder 89a of a cylindrical housing 89 of magnetic material.

The end 79 fits into an inner groove or notch 80a in a flywheel 80 to secure that end of the spring to the flywheel. The flywheel 80 is composed of magnetic material, and is freely rotatable and slidable along the hub 65 between annular shoulder 65a and a cylindrical core 87 of magnetic material. The mass of the flywheel 80 is much greater than that of the armature 78, preferably being such that the inertia rotation of the flywheel is at least twice that of the armature 78.

A coil 83 is fixed beween the housing 89 and core 87, and has lead 84 and 85 in the latter of which a selectively operable switch 86 is provided. An annular end plate 88 of non-magnetic material spaces the housing 89 and core 87 apart, and the entire annular electromagnetic stator comprising the elements 87, 88 and 89 are fixed against movement relative to the frame plate 60 by flange 90 of the housing 89 screwed to the plates 60 and 91. The lefthand end of the housing 89 projects slightly to the left of the end plate 88 and the lefthand end of the housing 89 so that the flywheel 80 contacts only the core 87 and a slight clearance space 92, preferably about five thousandths of an inch in thickness is provided between the flywheel and the plate 88 and housing 89. Similarly, the shoulder 89a projects slightly to the right of the coil 83 and righthand end of the core 87 to provide a slight clearance space 93 between the armature 78 and the coil 83 and core 87 so that engagement of the armature with the coil 83 and core 87 is prevented. The clearance space between the armature and elements 83 and 87 also is preferably about five thousands of an inch in thickness.

When the switch 86 is open, the coil 83 is deenergized and the clutch mechanism 75 is operative to drive the sleeve 65 and shaft 68 from the hub 61 through the spring 76, the rotation of the hub 61 being in the direction of the arrow 73 and serving to tighten the spring on the hub 61 and sleeve 65. This tightening action also is aided by the inertia of the flywheel 80. To disconnect the drive of the shaft 68 by the hub 61 and also permit free rotation of the shaft 68 relative to the electromagnetic stator unit, the switch 86 is closed to energize the coil 83. The coil 83 instantaneously stops the armature 78 by magnetically clamping the armature 78 against the shoulder 89a of the housing 89. The magnetic circuit is of low reluctance, and includes the housing 89, the armature 78, the core 87, and the flywheel 80, the air gaps 92 and 93 being very short and just sufficient to keep the armature 78 out of frictional contact with the core 87 and the flywheel out of frictional contact with the housing 89. The energization of the coil 83 also brings the flywheel 80 to a stop but only after the armature 78 is stopped, and the slight continued rotation of the flywheel unwinds the spring 76 sufficiently to free the sleeve 65 and hub 61 completely from the spring 76, and the flywheel is clamped magnetically in this position. This differential stopping of the armature 78 and flywheel 80 is caused by the greater inertia of the flywheel and also by the application of a greater torque to the armature than that applied to the flywheel. This differential torque is caused by the location of the shoulder 89a being spaced radially outward relative to the core 87. Thus, the frictional and magnetic force is applied to the armature much farther from the axis of rotation than is the magnetic and frictional force applied to the flywheel. The respective magnetic and frictional forces per se applied to the armature and flywheel are substantially equal but the difference in lever arm lengths are substantially different to provide the differential in torque.

It should be noted that the differential stopping action of the armature 78 and flywheel 80 may also be effected by constructing the flywheel of a material of less permeability than that of the armature. Thus, the desired differential stopping action may be effected by difference in inertia, permeability or torque or any combination of these factors.

Since further changes can be made in the foregoing construction and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. In combination; driving and driven cylindrical members in endwise relation, rotatable about a common axis and having the same external diameter; a prestressed helical clutch spring extending over and normally slightly gripping the external surfaces of said members and providing the driving connection therebetween when said driving member is rotated in one direction to rotate said driven member in the same direction, an armature in the form of an annular disc rotatably mounted on said driving member and connected to one end of said helical spring, and a stationarily mounted magnetic circuit including a stationary coil surounding said helical spring and disposed adjacent said armature for attracting the same on energization thereof to hold said armature against rotation and thereby unwind said spring from said driving member on continued rotation thereof in said one direction and interrupt the driving connection to said driven member.

2. In combination; driving and driven cylindrical members in endwise relation, rotatable about a common axis and having the same external diameter; a prestressed helical clutch spring extending over and normally slightly gripping the external surfaces of said members and providing the driving connection therebetween when said driving member is rotated in one direction to rotate said driven member in the same direction, an armature in the form of an annular disc rotatably mounted on said driving member and connected to one end of said helical spring, a stationarily mounted magnetic circuit including a stationary coil surrounding said helical spring and disposed adjacent said armature for attracting the same on energization thereof to hold said armature against rotation and thereby unwind said spring from said driving member on continued rotation thereof in said one direction and interrupt the driving connection to said driven member, and a flywheel in the form of an annular disc rotatably mounted on said driven member and connected to the other end of said spring to assist in declutching the same.

3. In combination; a drive shaft member rotating in a predetermined direction, a driven shaft member axially aligned with the drive shaft member, a coil spring having an interference fit with the drive shaft member and the driven shaft member and normally operative to clamp the shafts together, sliding friction means for stopping a first end of the spring to disconnect the spring from driving engagement with the shafts, and sliding friction means for stopping the second end of the spring after the first end has been stopped and for holding the first and second ends of the spring in positions in which the spring is out of clamping engagement with the shafts.

4. In combination; a drive member rotated in a predetermined direction, a driven member axially aligned with the drive member, a coil spring fitting closely over the adjacent ends of the drive and driven members and normally operative to drivingly connect the members together, a flywheel connected to a first end of the spring and acting to tighten the spring on the members when the spring is rotated and to loosen the spring on the members on overrunning of the spring by the flywheel, and sliding friction braking means operable to differentially brake the other end of the spring and the flywheel to cause the flywheel to overrun the spring and also operable to hold the flywheel in an overrun position in which the driven member is free to rotate relative to the spring.

5. In combination; an annular electromagnetic stator unit, a drive member extending into the unit from one end of the unit and rotate in a predetermined direction, a driven member aligned with the drive member and extending into the unit from the other end of the unit, a coil spring on the portions of the members extending into the unit and having an interference fit with the members, an annular armature of magnetic material connected to one end of the spring and rotatable on the drive member at one end of the unit, and an annular flywheel of magnetic material connected to the other end of the spring and rotatable on the driven member at the other end of the unit.

6. The combination defined by claim 5 wherein the stator unit includes an inner core and an outer housing having a shoulder, the flywheel being in frictional engagement with the core and spaced slightly from the housing, the armature being in frictional engagement with the shoulder of the housing and out of engagement and spaced slightly from the core.

7. In combination, an annular electro-magnetic stator unit having an inner core member of magnetic material extending from one end thereof and an outer housing member of magnetic material extending from the other end thereof, a drive member extending into the unit from one end thereof and rotated in a predetermined direction, a driven member aligned with the drive member and extending into the unit from the other end of the unit, a coil spring on the portions of the drive and driven members adjacent to one another and having an interference fit therewith, an annular armature of magnetic material connected to one end of the spring at said other end of the stator unit and rotatable on the drive member, and an annular fly-wheel of magnetic material at said one end of the stator unit and connected to the other end of the spring and rotatable on the driven member, the fly-wheel being movable into engagement with the inner core member and the armature being movable into engagement with the outer housing member.

References Cited in the file of this patent

UNITED STATES PATENTS

| 875,757 | Watson | Jan. 7, 1908 |
| 1,208,842 | Schnuck | Dec. 19, 1916 |
| 2,534,033 | La Brie | Dec. 12, 1950 |
| 2,829,748 | Sacchini et al. | Apr. 8, 1958 |
| 2,885,042 | Frechette | May 5, 1959 |

FOREIGN PATENTS

| 392,584 | Germany | May 29, 1924 |